US012582144B2

(12) United States Patent
Haywood

(10) Patent No.: US 12,582,144 B2
(45) Date of Patent: Mar. 24, 2026

(54) WATER BOTTLE DEVICE WITH ATTACHABLE INFUSION CONTAINER

(71) Applicant: Leslie Haywood, Southfield, MI (US)

(72) Inventor: Leslie Haywood, Southfield, MI (US)

( * ) Notice: Subject to any disclaimer, the term of this patent is extended or adjusted under 35 U.S.C. 154(b) by 0 days.

(21) Appl. No.: 18/194,778

(22) Filed: Apr. 3, 2023

(65) Prior Publication Data

US 2023/0309583 A1     Oct. 5, 2023

Related U.S. Application Data

(60) Provisional application No. 63/327,125, filed on Apr. 4, 2022.

(51) Int. Cl.
| | |
|---|---|
| *B65D 41/04* | (2006.01) |
| *A23L 2/56* | (2006.01) |
| *A23L 2/66* | (2006.01) |
| *B65D 47/08* | (2006.01) |

(52) U.S. Cl.
CPC .................................... *A23L 2/66* (2013.01); *A23L 2/56* (2013.01); *B65D 41/0414* (2013.01); *B65D 47/0828* (2013.01); *A47G 2400/04* (2013.01)

(58) Field of Classification Search
CPC ........................... B65D 51/2878; B65D 77/286
See application file for complete search history.

(56) References Cited

U.S. PATENT DOCUMENTS

| | | | | |
|---|---|---|---|---|
| 5,597,089 A | * | 1/1997 | Smith | ..................... B65D 25/42 |
| | | | | 220/267 |
| 5,772,017 A | * | 6/1998 | Kang | ................. B65D 51/2842 |
| | | | | 426/115 |
| 8,376,134 B1 | | 2/2013 | Underwood | |
| 8,408,389 B1 | | 4/2013 | Anderson | |
| 8,701,906 B1 | * | 4/2014 | Anderson | .............. B65D 41/20 |
| | | | | 215/DIG. 8 |
| 10,433,632 B2 | | 10/2019 | Resic | |
| 11,708,200 B1 | * | 7/2023 | Xu | ..................... B65D 81/3211 |
| | | | | 206/528 |
| 2010/0116213 A1 | * | 5/2010 | Cahill | ..................... A01K 7/005 |
| | | | | 119/72.5 |
| 2011/0166910 A1 | * | 7/2011 | Marina | .............. B65D 51/2835 |
| | | | | 705/7.29 |
| 2014/0305817 A1 | * | 10/2014 | Guery | ....................... A61J 9/00 |
| | | | | 206/221 |
| 2014/0312065 A1 | * | 10/2014 | Rohr | .................... B65D 47/247 |
| | | | | 222/129 |

(Continued)

FOREIGN PATENT DOCUMENTS

| | | | | |
|---|---|---|---|---|
| KR | 101516372 B1 | * | 5/2015 | |

OTHER PUBLICATIONS

English translation of KR101516372 generated by google patents (Year: 2015).*

*Primary Examiner* — Don M Anderson
(74) *Attorney, Agent, or Firm* — Brennan, Manna & Diamond, LLC

(57) ABSTRACT

The present invention relates to a water bottle device with attachable infusion container. During use, a container of the device holding a powdered substance can be attached to a water bottle of the device by removing the lid of the bottle. Then, the powdered substance can be released from the container into the water bottle for mixing with the liquid in the water bottle.

4 Claims, 3 Drawing Sheets

(56)                    References Cited

U.S. PATENT DOCUMENTS

| | | | |
|---|---|---|---|
| 2015/0175337 A1* | 6/2015 | Lee | B65D 81/3211 |
| | | | 206/219 |
| 2015/0250349 A1 | 9/2015 | Ng | |
| 2016/0167852 A1* | 6/2016 | Moradi | B65D 47/06 |
| | | | 215/227 |
| 2018/0238727 A1* | 8/2018 | Wong | B65D 81/3211 |
| 2019/0021474 A1 | 1/2019 | Resic | |
| 2020/0002066 A1* | 1/2020 | Guery | B65D 51/285 |
| 2022/0000245 A1* | 1/2022 | Kim | B65D 47/42 |
| 2022/0009697 A1* | 1/2022 | Olmstead | B65D 47/06 |
| 2022/0063880 A1* | 3/2022 | Bouteloup | B65D 51/2821 |
| 2022/0153500 A1* | 5/2022 | Lee | B65D 51/2835 |
| 2022/0168934 A1* | 6/2022 | Shen | A47G 19/00 |
| 2022/0306354 A1* | 9/2022 | Hayashi | B65D 47/142 |
| 2022/0388753 A1* | 12/2022 | Jaramillo | B65D 81/3211 |
| 2023/0271766 A1* | 8/2023 | Antico | A61J 11/008 |
| | | | 215/11.1 |

* cited by examiner

WATER BOTTLE DEVICE WITH ATTACHABLE INFUSION CONTAINER

CROSS-REFERENCE TO RELATED APPLICATION

The present application claims priority to, and the benefit of, U.S. Provisional Application No. 63/327,125, which was filed on Apr. 4, 2022, and is incorporated herein by reference in its entirety.

FIELD OF THE INVENTION

The present invention relates generally to the field of water bottle mixing devices. More specifically, the present invention relates to a water bottle device with attachable infusion container. During use, a container of the device holding a powdered substance can be attached to a water bottle of the device by removing the lid of the bottle. Then, the powdered substance can be released from the container into the water bottle for mixing with liquid within the water bottle. Accordingly, the present disclosure makes specific reference thereto. Nonetheless, it is to be appreciated that aspects of the present invention are also equally applicable to other like applications, devices, and methods of manufacture.

BACKGROUND

Individuals who mix powdered substances like protein powder, workout-enhancing powder, etc., into their water bottles can have a difficult time properly mixing the drink before or during a workout or run. As a result, the powdered substance can be spilled during the mixing process. This is undesirable, as it leaves the user unable to consume their desired mixture. In addition, storing and transporting powdered substances for workouts can be frustrating.

Therefore, there exists a long-felt need in the art for a powdered substance and liquid mixing device. More specifically, there exists a long-felt need in the art for a water bottle device with attachable infusion container that provides users with a combination water bottle and container system designed to release powdered substances into the water bottle. In addition, there exists a long-felt need in the art for a water bottle device with attachable infusion container that allows users to release powdered substances into the water bottle without the possibility of spilling the powdered substances. Furthermore, there exists a long-felt need in the art for a water bottle device with attachable infusion container that provides users with a combination water bottle and container system designed to release powdered substances into the water bottle without the possibility of spilling the powdered substances, wherein the container can be secured to the water bottle during use.

The subject matter disclosed and claimed herein, in one embodiment thereof, comprises a water bottle device with attachable infusion container. The device is primarily comprised of a container that attaches to at least one water bottle, the container is comprised of a button and an interior space and also having at least one door. During use, the container can store a powdered substance that is intended to be mixed with the liquid inside the water bottle. When a user desires to mix the substance with the liquid of the water bottle, a user can attach the container to the bottle by removing the bottle lid. Then, the user can press the button to release the hinge which allows the powdered substance to fall through the door and into the water bottle to be mixed with the liquid.

The container can be secured to the bottle via a tether when not physically attached to the bottle as during the mixing process.

In this manner, the water bottle device with attachable infusion container of the present invention accomplishes all the foregoing objectives and provides users a device with a combination water bottle and container system designed to release powdered substances into the water bottle without the possibility of spilling the powdered substances. In addition, the container can be secured to the water bottle during use via the tether.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a water bottle device with attachable infusion container. The device is primarily comprised of a container that attaches to at least one water bottle, the container is comprised of a button and an interior space and also having at least one door. The device is designed to allow a user to possess a water bottle filled with a liquid and then mix the liquid with another substance or compound that is stored within the container while the container is attached to the water bottle.

The water bottle has an opening and a lid with at least one drinking spout and at least one fastener that allows the lid to attach to the water bottle via at least one reciprocating fastener of the bottle. Said fasteners are preferably male and female threads. The container attaches to the fastener on the exterior of the bottle once the lid has been removed. More specifically, the second end of the container is comprised of at least one fastener on the interior surface of the container that is preferably the same type of reciprocating fastener as the water bottle fastener.

The interior space of the container can house at least one compound that is preferably a dry, powered substance such as protein powder, BCAA powder, amino acid powder, electrolyte powder, flavoring powder, etc., that is intended to be mixed with the liquid of the bottle. The interior space is also comprised of at least one internal door attached within the interior space via at least one hinge. When storing the compound, the door is closed. When a user desires to mix the compound with the liquid of the bottle (after the lid has been removed and the container has been attached to the bottle) a user can press at least one button to release the hinge such that the door opens towards into (or towards) the bottle. As a result, the compound falls into the bottle via the opening of the container and can then be mixed with the liquid of the bottle.

The present invention is also comprised of a method of using the device. First, a device is provided comprised of a container that attaches to at least one water bottle with a removable lid, the container is comprised of a button and an interior space and also having at least one door. Then, a compound is placed within the container and is secured within the container via the door which is closed. Then, the lid of the bottle can be removed, and the container can be secured to the bottle via fasteners on the bottle and container. Next, a button on the container can be pressed to open the door to release the compound into the water bottle. Next, any liquid within the bottle can be mixed with the compound to create a mixture by shaking the bottle with the container attached.

Accordingly, the water bottle device with attachable infusion container of the present invention is particularly advantageous as it provides users a device with a combination water bottle and container system designed to release powdered substances into the water bottle without the possibility of spilling the powdered substances. In addition, the container can be secured to the water bottle during use via the tether. In this manner, the water bottle device with attachable infusion container overcomes the limitations of existing methods and devices used to mix powdered substances with a liquid in a water bottle.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
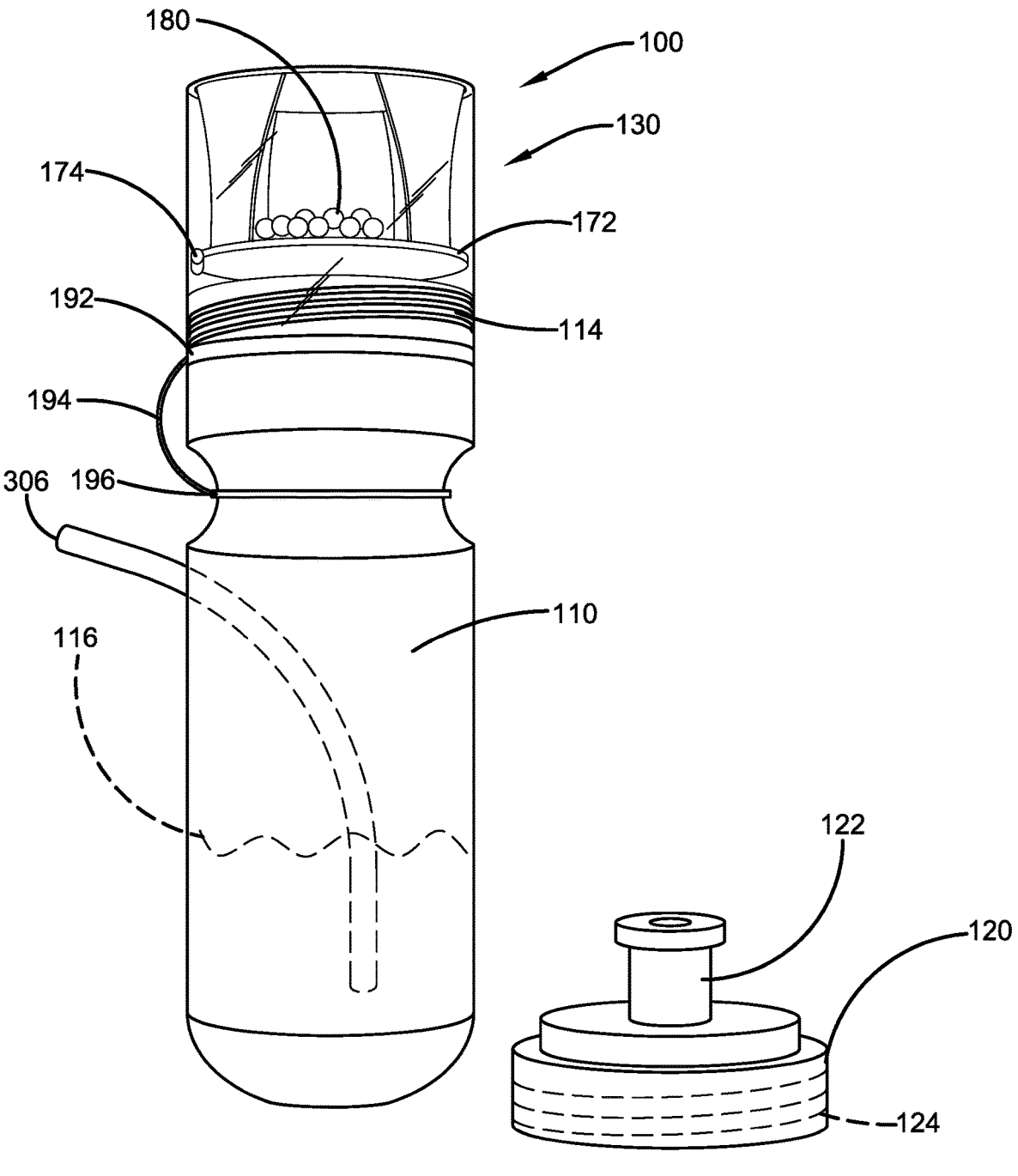
FIG. 1 illustrates a perspective view of one potential embodiment of a water bottle device with attachable infusion container of the present invention in accordance with the disclosed architecture.

The innovation is now described with reference to the drawings, wherein like reference numerals are used to refer to like elements throughout. In the following description, for purposes of explanation, numerous specific details are set forth to provide a thorough understanding thereof. It may be evident, however, that the innovation can be practiced without these specific details. In other instances, well-known structures and devices are shown in block diagram form to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a powdered substance and liquid mixing device. More specifically, there exists a long-felt need in the art for a water bottle device with attachable infusion container that provides users with a combination water bottle and container system designed to release powdered substances into the water bottle. In addition, there exists a long-felt need in the art for a water bottle device with attachable infusion container that allows users to release powdered substances into the water bottle without the possibility of spilling the powdered substances. Furthermore, there exists a long-felt need in the art for a water bottle device with attachable infusion container that provides users with a combination water bottle and container system designed to release powdered substances into the water bottle without the possibility of spilling the powdered substances, wherein the container can be secured to the water bottle during use.

The present invention, in one exemplary embodiment, is comprised of a water bottle device with attachable infusion container primarily comprised of a container that attaches to at least one water bottle, the container is comprised of a button and an interior space and also having at least one door. The device is designed to allow a user to possess a water bottle filled with a liquid and then mix the liquid with another substance or compound that is stored within the container while the container is attached to the water bottle.

The water bottle has an opening and a lid with at least one drinking spout and with at least one fastener that allows the lid to attach to the water bottle via at least one reciprocating fastener of the bottle. Said fasteners are preferably male and female threads. The container attaches to the fastener on the exterior of the bottle once the lid has been removed. More specifically, the second end of the container is comprised of at least one fastener on the interior surface of the container that is preferably the same type of reciprocating fastener as the water bottle fastener.

The interior space of the container can house at least one compound. Said compound is preferably a dry, powered substance such as protein powder, BCAA powder, amino acid powder, electrolyte powder, flavoring powder, etc., that is intended to be mixed with the liquid (i.e., water) of the bottle. The interior space is also comprised of at least one internal door attached within the interior space via at least one hinge. When storing the compound, the door is closed. When a user desires to mix the compound with the liquid of the bottle (after the lid has been removed and the container has been attached to the bottle) a user can press at least one button to release the hinge, such that the door opens into (or towards) the bottle. As a result, the compound falls into the bottle via the opening of the container and can then be mixed with the liquid of the bottle.

The present invention is also comprised of a method of using the device. First, a device is provided comprised of a container that attaches to at least one water bottle with a removable lid, the container is comprised of a button and an interior space and also having at least one door. Then, a compound is placed within the container and is secured within the container via the door which is closed. Then, the lid of the bottle can be removed, and the container can be secured to the bottle via fasteners on the bottle and container. Next, a button on the container can be pressed to open the door to release the compound into the water bottle. Next, any liquid within the bottle can be mixed with the compound to create a mixture by shaking the bottle with the container attached.

Accordingly, the water bottle device with attachable infusion container of the present invention is particularly advantageous as it provides a device that provides users with a combination water bottle and container system designed to release powdered substances into the water bottle without the possibility of spilling the powdered substances. In addition, the container can be secured to the water bottle during use via the tether. In this manner, the water bottle device with attachable infusion container overcomes the limitations of existing methods and devices used to mix powdered substances with a liquid in a water bottle.

Referring initially to the drawings, FIG. 1 illustrates a perspective view of one potential embodiment of a water bottle device with attachable infusion container 100 of the present invention in accordance with the disclosed architecture. The device 100 is primarily comprised of a container 130 which attaches to at least one water bottle 110, the container 130 comprised of a button 176 and an interior space 170 and also having at least one door 172. The device 100 is designed to allow a user to possess a water bottle 110 filled with a liquid 116 and then mix the liquid 116 with another substance or compound 180 that is stored within the container 130 while the container 130 is attached to the water bottle 110.

The device 100 and all components are preferably made from a plastic material but may be made from any material known in the art such as, but not limited to, double insulated stainless steel. The water bottle 110 may be any size, shape, and configuration of water bottle 10 known in the art that has an opening 112 and a lid 120 with at least one drinking spout 122 and at least one fastener 124 that allows the lid 120 to attach to the water bottle via at least one reciprocating fastener 114 of the bottle 110.

In different embodiments, the drinking spout 122 may be any type of drinking spout known in the art. This includes, but is not limited to, a push-pull spout, a flip-up spout, a screw-on spout, a straw, a flip-up cap spout, a slide-cap spout, a push-button spout, a straw with a cap spout, etc. The fasteners 114,124 may be any type of reciprocating fasteners known in the art but are preferably male and female threads of any spacing known in the art.

The container 130 attaches to the fastener 114 on the exterior of the bottle 110 once the lid 120 has been removed. More specifically, the second end 150 of the container 130 is comprised of at least one fastener 152 on the interior surface of the container 130. The fastener 152 is preferably the same type of reciprocating fastener as the water bottle 10 fastener 114.

Figure 2:
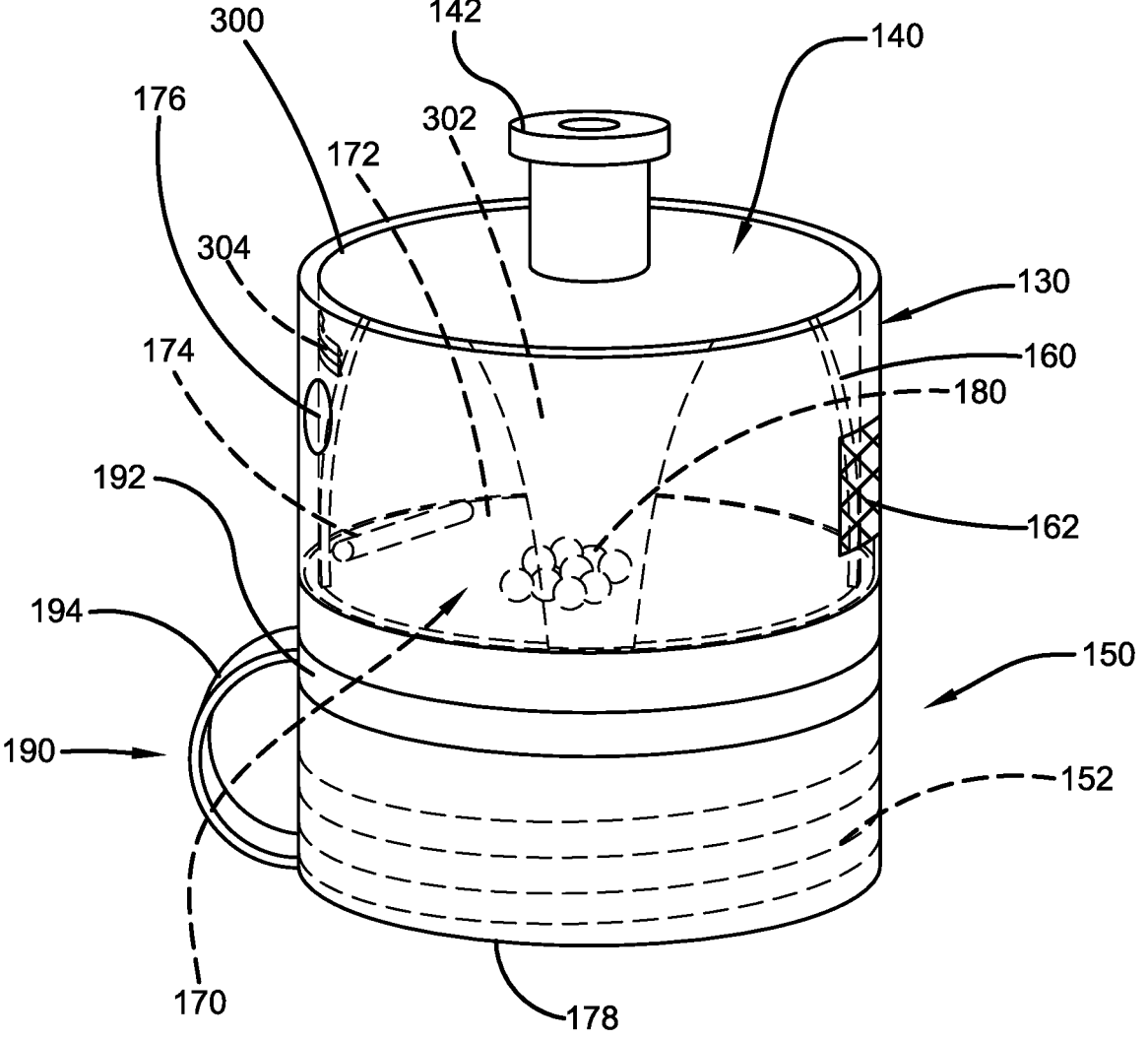
FIG. 2 illustrates a perspective view of a container of one potential embodiment of a water bottle device with attachable infusion container of the present invention in accordance with the disclosed architecture.

The interior space 170 of the container 130 can house at least one compound 180 that rests on the door 172, as seen in FIG. 2. The compound 180 may be a dry, powered substance such as protein powder, BCAA powder, amino acid powder, electrolyte powder, flavoring powder, etc., that is intended to be mixed with the liquid 116 of the bottle 110. In another embodiment, the compound 180 may be a secondary liquid that is intended to be mixed with the liquid 116 of the bottle 110.

The interior space 170 is also comprised of at least one internal door 172. The door 172 may be attached within the interior space 170 via at least one hinge 174. The hinge 174 is preferably spring-loaded but may be any hinge type known in the art. When storing the compound, 180 the door 172 is closed. When a user desires to mix the compound 180 with the liquid 116 of the bottle 110 (after the lid 120 has been removed and the container 130 has been attached to the bottle 110), a user can press at least one button 176 (located anywhere on the container) to release the hinge 174 such that the door 172 opens into (or towards) the bottle 110. As a result, the compound 180 falls into the bottle 110 via the opening 178 of the container 130 and can then be mixed with the liquid 116 of the bottle 110.

In one embodiment, pushing down on the entire container 130 forces the hinge 174 to be released. More specifically, in this embodiment the container 130 is comprised of an internal frame 300 with at least one leg 302. The drinking spout 142 is attached to the frame 300 such that pressing down the spout 142 presses the legs 302 downwards into the container 130 such that that they release the hinge 174/door 172. Once opened, the door 172 may be helped open via ridges 304 in the interior space 170 of the container 130.

In one embodiment, the first end 140 of the container 130 is comprised of at least one drinking spout 142 that is of the same type of spout 122 as the lid 120. In this embodiment, once a user releases the compound 180 from the container 130 into the bottle 110 after attaching the container 130 to the bottle 110, the user can drink the mixture from the spout 142 of the container 130. In a different embodiment, the container 130 is only used for mixing and has no drinking spout 142. In this embodiment, the user must replace the lid 120 to drink the mixture from the bottle 110, and wherein the drinking spout 142 is a removable cap to allow a user to pour the compound 180 into the container 130. In another embodiment, the bottle 110 is comprised of at least one integrated straw 306 that may be made from a flexible material and allows the user to drink from the bottle 110 without removing the container 130.

To facilitate grip of the container 130, the exterior surface 160 of the container 130 may be comprised of at least one grip 162. The grip 162 may be comprised of any non-slip rubber material that may be recessed or textured to promote grip.

To ensure the container 130 remains attached to the bottle 110 (while attached to the bottle 110 or separate from the bottle 110), the device may be comprised of at least one tether 190. The tether 190 is preferably made from an elastic rubber material with a first loop 192 that can be placed around the container 130 and a second loop 196 that can be placed around the bottle 110. Both loops 192,196 are connected by a connecting member 194.

Figure 3:
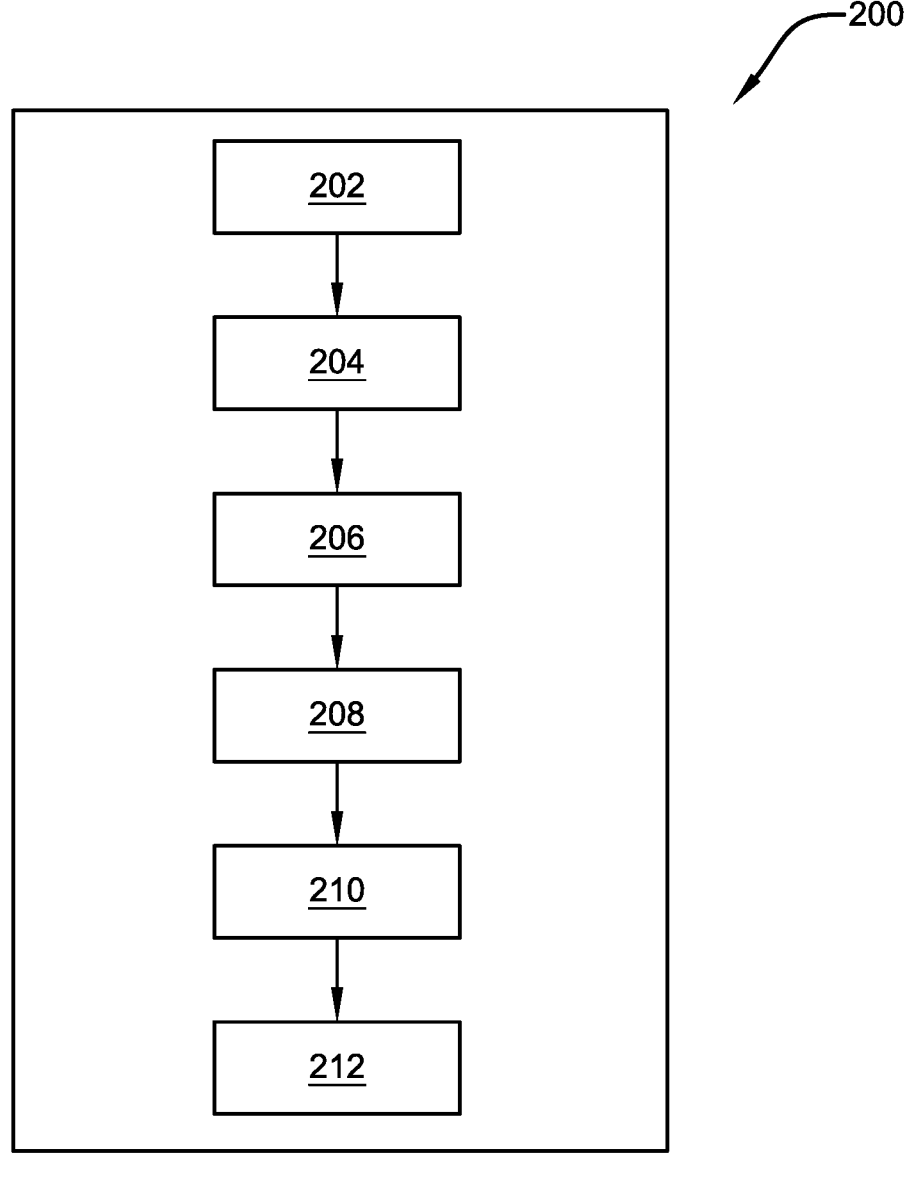
FIG. 3 illustrates a flowchart of a method of using one potential embodiment of a water bottle device with attachable infusion container of the present invention in accordance with the disclosed architecture.

The present invention is also comprised of a method of using the device 100, as seen in FIG. 3. First, a device 100 is provided comprised of a container 130 that attaches to at least one water bottle 110 with at least one removable lid 120, the container 130 comprised of a button 176 and an interior space 170 and also having at least one door 172 [Step 202]. Then, a compound 180 is placed within the container 130 and is secured within the container 130 via a door 172 which is closed [Step 204]. Then, the lid 120 of the bottle 110 can be removed and the container 130 can be secured to the bottle 110 via fasteners 114,152 on the bottle 110 and container 130 [Step 206]. Next, a button 176 on the container 130 can be pressed to open the door 172 to release the compound 180 into the water bottle 10 [Step 208]. Next, any liquid 116 within the bottle 10 can be mixed with the compound 180 to create a mixture by shaking the bottle 110 with the container 130 attached [Step 210]. Then, a user can drink the mixture through the lid 120 by removing the container 130 and replacing the lid 120 on the bottle 110 or via a spout 142 found on the container 130 (in an embodiment of the device 100 wherein the container 130 has a drinking spout 142) [Step 212].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "water bottle device with attachable infusion container" and "device" are interchangeable and refer to the water bottle device with attachable infusion container 100 of the present invention.

Notwithstanding the foregoing, the water bottle device with attachable infusion container 100 of the present invention and its various components can be of any suitable size and configuration as is known in the art without affecting the overall concept of the invention, provided that they accomplish the above-stated objectives. One of ordinary skill in the art will appreciate that the size, configuration, and material of the water bottle device with attachable infusion container 100 as shown in the FIGS. are for illustrative purposes only, and that many other sizes and shapes of the water bottle device with attachable infusion container 100 are well within the scope of the present disclosure. Although the dimensions of the water bottle device with attachable infusion container 100 are important design parameters for user convenience, the water bottle device with attachable infusion container 100 may be of any size, shape, and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A water bottle device comprising:
a water bottle comprised of a first opening, a first fastener, and a removable lid comprised of a drinking spout and a second fastener configured to mate with the first fastener;
an infusion container component comprised of a first end, a second end comprised of a third fastener configured to mate with the first fastener of the water bottle when the removable lid is removed, an interior space comprised of a door and a hinge, a button, an internal frame with at least one leg, a second opening, and a grip; and
a tether comprised of a first loop, a second loop, and a connecting member, wherein the tether connects the infusion container component to the water bottle; and
wherein a second drinking spout is attached to the internal frame, such that pressing down the second drinking spout presses the at least one leg downwards into the infusion container component such that the at least one leg releases the hinge and the door, allowing a contents of the interior space to be released into the water bottle;
wherein the first drinking spout is a screw-on spout and the second drinking spout is a slide-cap spout; and
wherein the internal frame further comprises a plurality of interior ridges configured to keep the door open when the hinge is released.

2. The water bottle device of claim 1, wherein the tether is comprised of an elastic material.

3. The water bottle device of claim 1, wherein the grip is comprised of a non-slip rubber material.

4. The water bottle device of claim 1, wherein the water bottle is comprised of a double-insulated stainless-steel material.

* * * * *